June 22, 1965  H. G. THOMPSON  3,190,365
PARKING STAND FOR TWO-WAY PLOWS
Filed April 27, 1962  4 Sheets-Sheet 1

INVENTOR.
HOWARD G. THOMPSON
BY
ATTORNEYS.

INVENTOR.
HOWARD G. THOMPSON
BY
Wolfe, Hubbard, Voit & Osann
ATTORNEYS.

June 22, 1965
H. G. THOMPSON
3,190,365
PARKING STAND FOR TWO-WAY PLOWS
Filed April 27, 1962
4 Sheets-Sheet 4
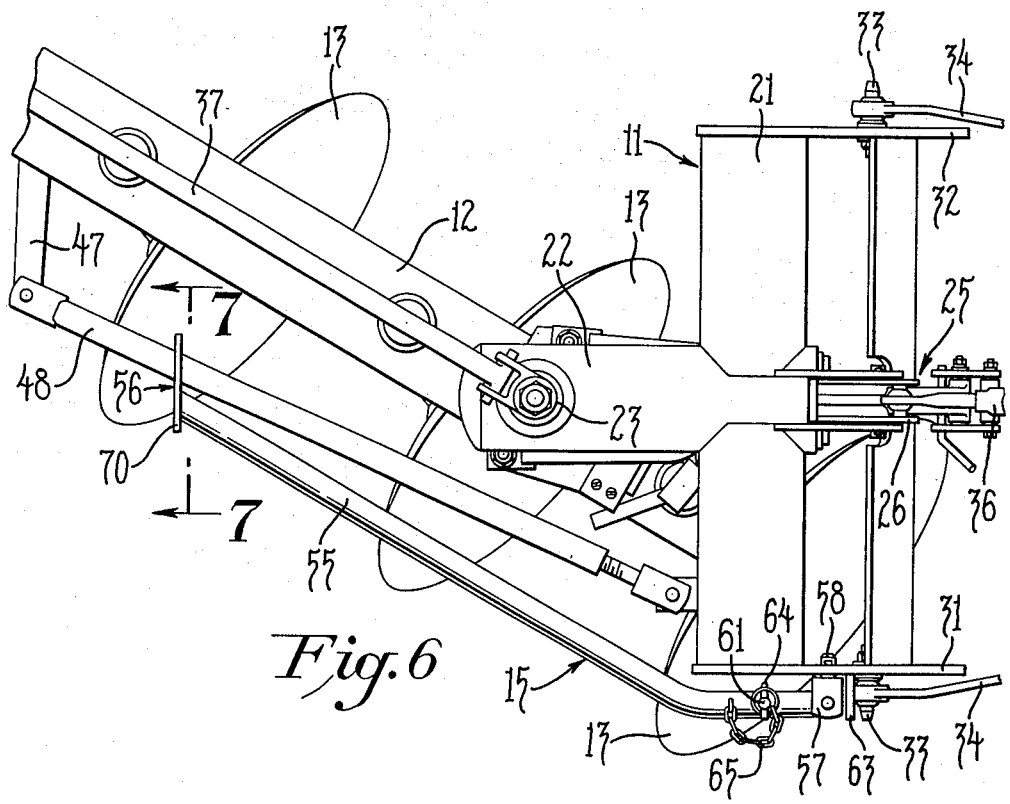
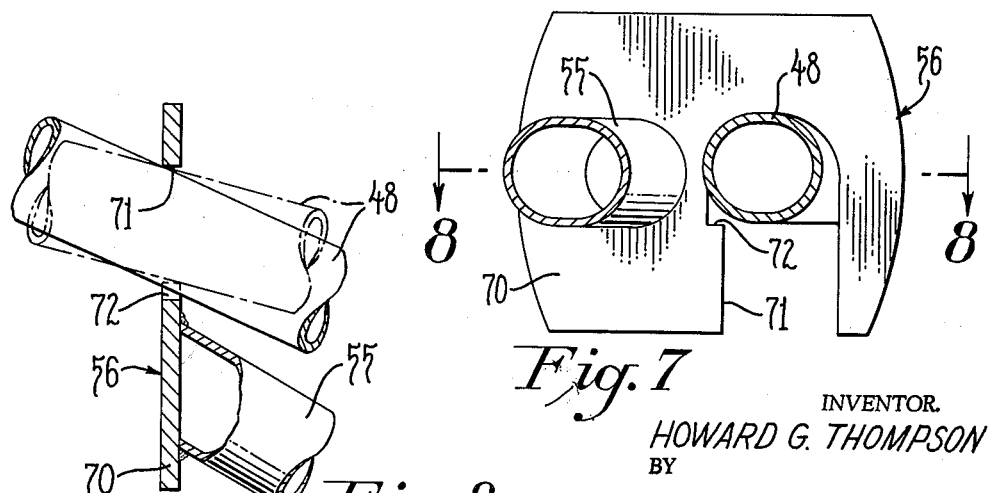
INVENTOR.
HOWARD G. THOMPSON
BY
ATTORNEYS.

United States Patent Office 3,190,365
Patented June 22, 1965

3,190,365
PARKING STAND FOR TWO-WAY PLOWS
Howard G. Thompson, Livonia, Mich., assignor to Massey-Ferguson Inc., Detroit, Mich., a corporation of Maryland
Filed Apr. 27, 1962, Ser. No. 190,623
5 Claims. (Cl. 172—219)

This invention relates to agricultural plows and concerns, more particularly, a parking stand for a two-way or reversible disk plow.

It is an object of the invention to provide a parking stand for a two-way disk plow that is simple in design so as to be economical to manufacture and easy to use.

More specifically, it is an object to provide a stand of the above type that gives, when in support position, a rigid point of support positioned laterally and well spaced from the line of plow disks when the disks are alined in one of their "two-way" positions. In this way, a stable support for the unhitched plow is obtained.

Moerover, it is an object to provide a stand as characterized above that locks up and prevents an inadvertent attempt to support the plow on the stand when the plow disks are not properly disposed with respect to the stand support point.

Other objects and advantages of the invention will become apparent upon reading the following detailed description and upon reference to the drawings, in which:

FIG. 6 is a fragmentary view similar to FIG. 2 and showing the two-way plow in its reversed or alternate position;

FIG. 7 is a fragmentary enlarged section taken approximately along the line 7—7 in FIG. 6; and FIG. 8 is an enlarged section taken along the line 8—8 in FIG. 7.

While the invention will be described in connection with a preferred embodiment, it will be understood that I do not intend to limit the invention to that embodiment. On the contrary, I intend to cover all alterntives, modifications and equivalents as may be included within the spirit and scope of the invention as defined by the appended claims.

Figure 1:
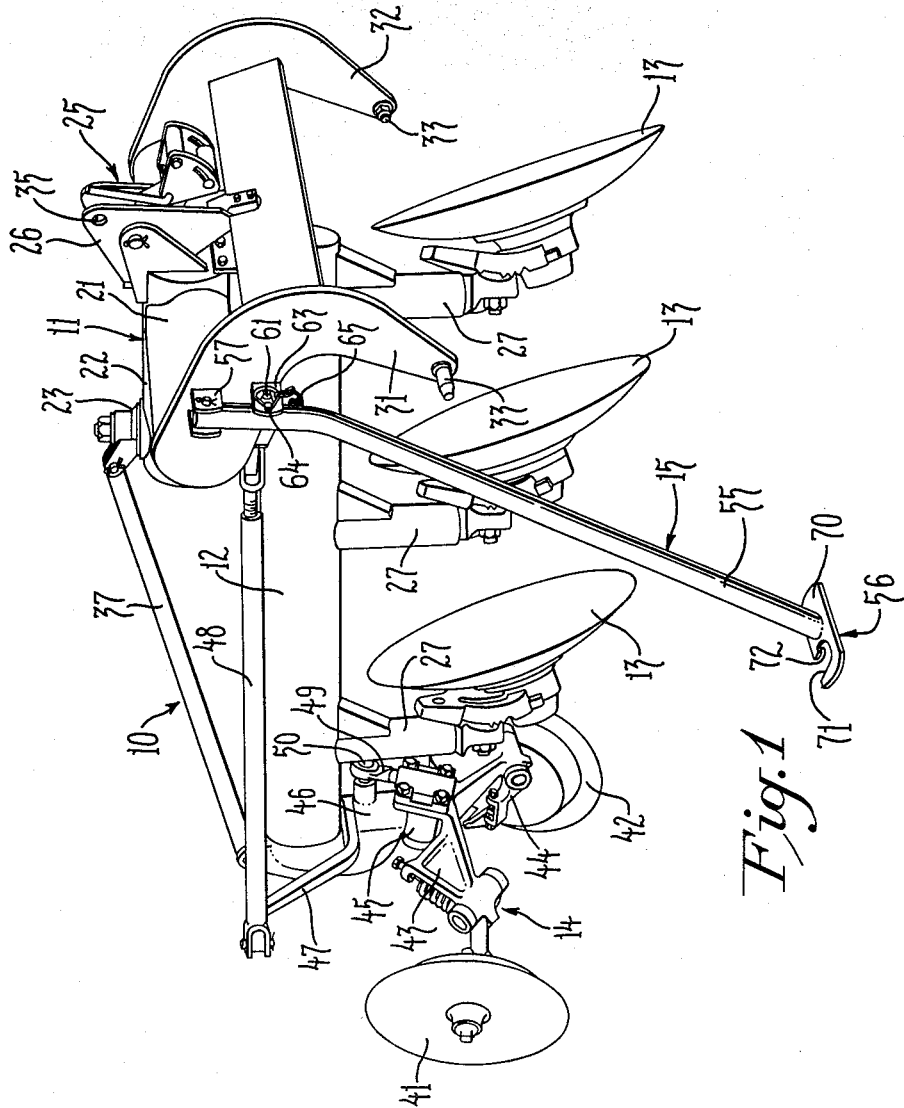
FIGURE 1 is a perspective of a two-way disk plow supported by a stand embodying the present invention.

Turning now to FIG. 1, there is shown a two-way disk plow 10 including a main frame 11 supporting a rearwardly extending plow beam 12. A plurality of plow elements in the form of disks 13 are mounted in alinement beneath the plow beam 12 and a furrow wheel assembly 14 is positioned at the rear of the plow beam. The plow 10 is shown disconnected in FIG. 1 and supported on a parking stand 15 which is constructed in accordance with the invention.

Figure 2:
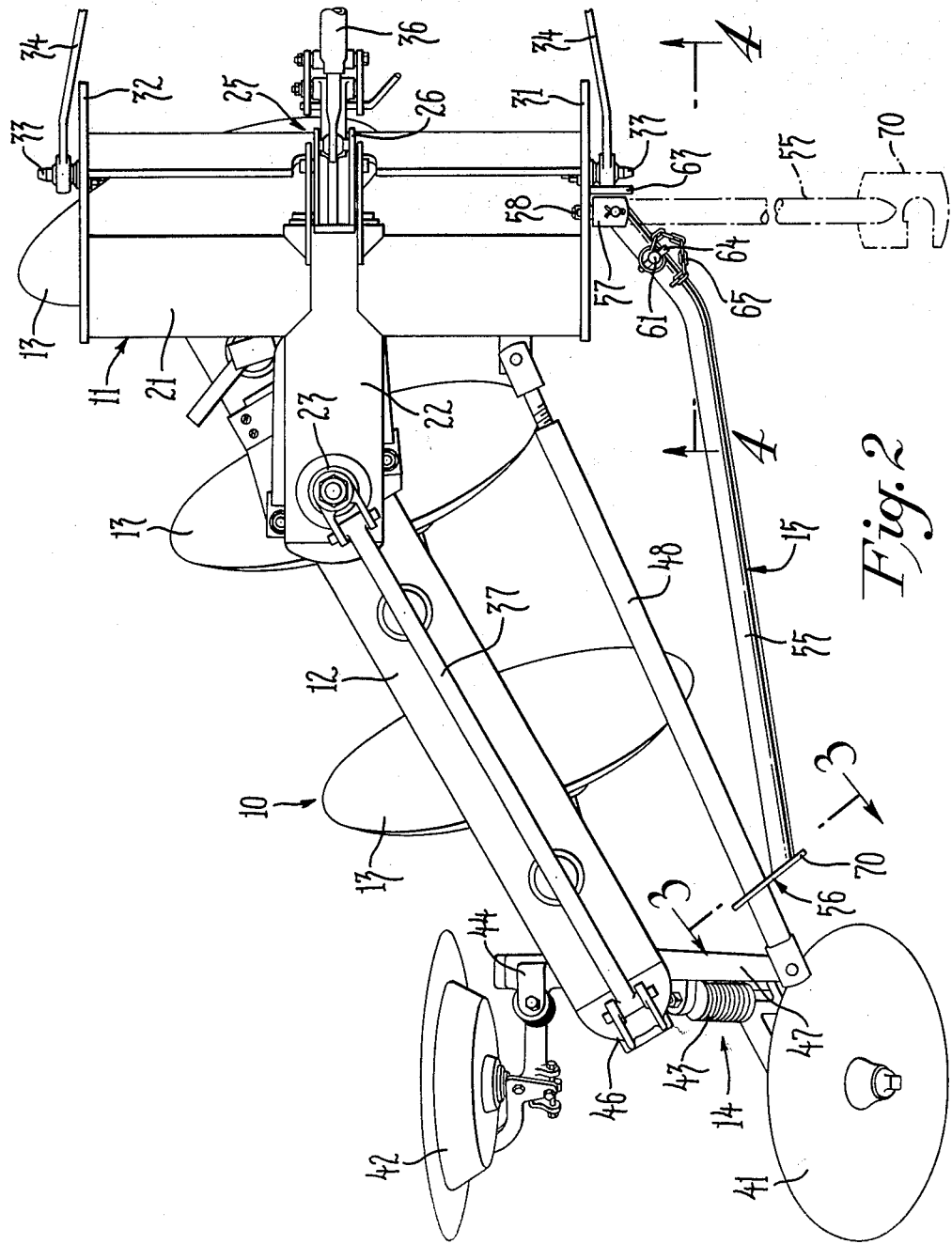
FIG. 2 is a plan of the plow shown in FIG. 1 mounted on a tractor hitch linkage which is fragmentarily illustrated.
Figure 3:
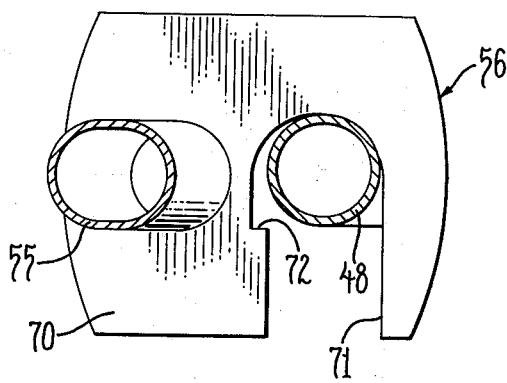
FIG. 3 is an enlarged fragmentary section taken approximately along the line 3—3 in FIG. 2.
Figure 5:
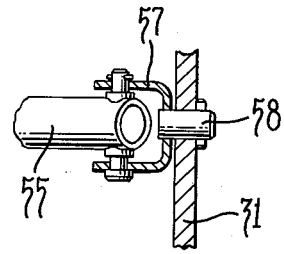
FIG. 5 is a fragmentary section taken approximately along the line 5—5 in FIG. 4.

The main frame 11 is generally T-shaped, as best seen in FIGS. 2 and 6, and includes a tubular cross portion 21 and a stem portion 22. The plow beam 12 is pivoted at 23 for rotation about a vertical axis at the rear of the main frame stem portion 22. In the preferred embodiment, an actuating mechanism 25 including a toggle member 26 is mounted on the main frame 11 and arranged to swing the plow beam 12 from side to side between its two operating positions illustrated, respectively, in FIGS. 2 and 6. The disks 13 are pivoted for limited side-to-side, swinging movement in sleeves 27 depending from the beam 12 so that the disks 13 can assume the proper angle of attack with respect to the direction of plow movement when the plow beam 12 is swung into either one of its two alternate operating positions.

To mount the plow 10 on a tractor, the main frame includes a pair of side plates 31 and 32 which carry, at their lower ends, draft pins 33 to which the trailing ends of a pair of tractor draft links 34 may be secured. The plow 10 is primarily intended for a three-point tractor hitch linkage of the well-known "Ferguson Type" and, hence, the toggle member 26, comprising two laterally spaced plates, is formed with an aperture 35 which permits securement of a top link 36 to the main frame 11. As will be well-known to those familiar with this art, the three-point hitch linkage permits the plow 10 to be lifted clear of the ground for transport purposes. Preferably, a strut 37 extends from the main frame 11 to the rear of the plow beam 12 so as to rigidify the structure, both when the plow is elevated and when subjected to operating loads.

The furrow wheel assembly 14 includes a pair of alternately operable furrow wheels 41 and 42. The wheels 41, 42 are journalled on respective knee-action legs 43 and 33 which are joined at their upper ends to form an inverted V whose vertex is journalled for rotation about a fore-and-aft axis in a "steering" knuckle 45. The knuckle 45 is journalled for rotation about a vertical axis in a rear casting 46 forming the back portion of the plow beam 12. The top of the steering knuckle 45 carries a pitman arm 47 which is connected by an elongated drag link 48 to the cross portion 21 of the main frame 11.

It can thus be seen that swinging movement of the beam 12 between its two alternate operating positions causes the drag link 48, through the pitman arm 47, to rotate the steering knuckle 45 relative to the rear casting 46 of the plow beam. Viewed another way, the pitman arm 47 and its attached steering knuckle 45 remain at a fixed angular disposition with respect to the main frame 11 of the plow, while the rear end of the plow beam 12 rotates relative to the steering knuckle.

For tilting the legs 43, 44 so as to bring the furrow wheels 41, 42 alternately into operation, the joined legs 43, 44 slidably support an upwardly extending pin 49 having a ball-type universal connection to a stud 50 extending forwardly from the plow beam rear casting 46. Since the horizontal axis about which the legs 43, 44 tilt always remains in a substantially true fore-and-aft direction because of the pitman arm 47 and the drag link 48, it will be seen that the stud 50 swings from side to side of this horizontal axis as the plow beam 12 moves between its alternate operating positions. That is, with the plow beam 12 in its FIGS. 1 and 2 position, the stud 50 is swung to the left, as seen facing the direction of plow movement, of the horizontal axis about which the legs 43, 44 tilt. As a result, the pin 49 is swung in a counterclockwise direction as viewed from the rear of the plow with the result that the furrow wheel 42 is brought down into operating position.

When the plow beam 12 is swung to its alternate operating position, to the left of the plow's direction of movement, the stud 50 is moved to the right of the horizontal axis about which the legs 43, 44 tilt, with the result that the pin 49 is swung in a clockwise direction to bring the furrow wheel 41 down into operating position.

Figure 4:
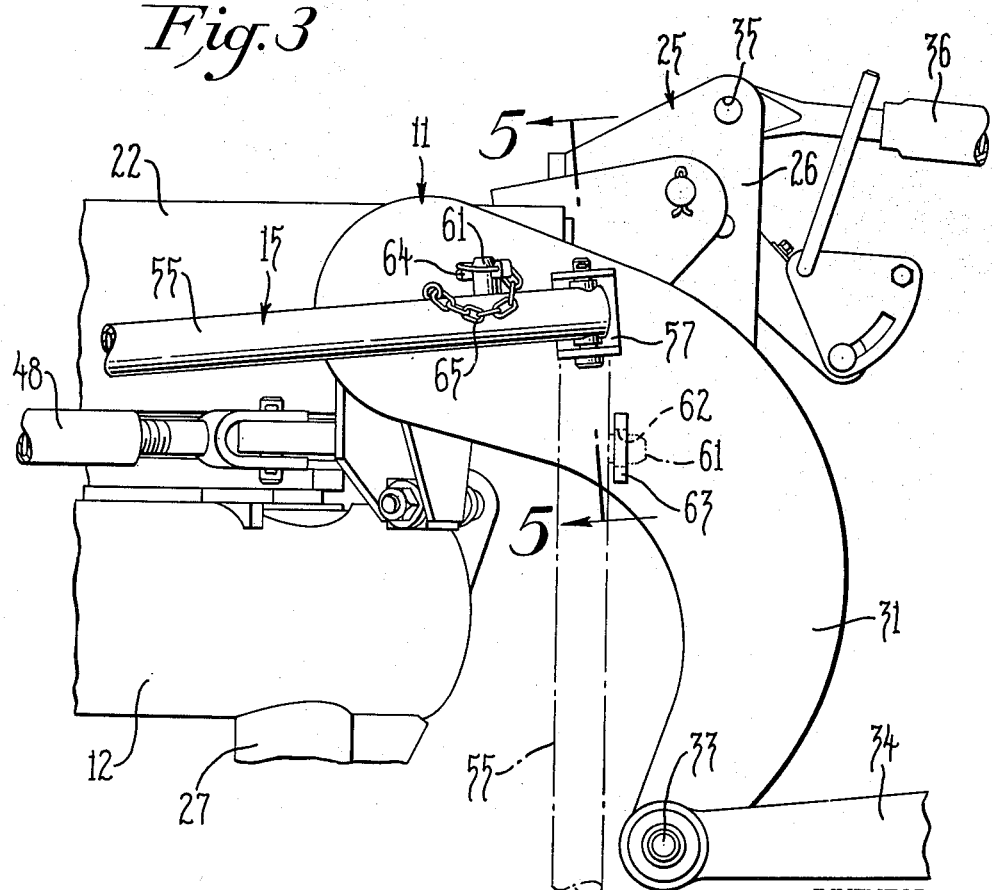
FIG. 4 is an enlarged fragmentary elevation taken approximately along the line 4—4 in FIG. 2.

In accordance with the invention, the parking stand 15 includes a leg 55 pivoted on the main frame 11 to have an effective support position when the plow beam 12 is swung to one side, that shown in FIGS. 1 and 2, and a latch 56 which locks the leg 55 in transport position unless the beam 12 is in its parking, FIGS. 1 and 2, position. In the preferred embodiment, the link 55 is universally pivoted on the main frame side plate 31 by being loosely pinned between the arms of a U-shaped bracket 57 that is rotatably secured by a stud 58 in plate 31. Preferably, the leg 55 carries a locking pin 61 which, when the leg 55 is in its supporting position, is received within an aperture 62 formed in a tab 63 extending rigidly from the plate 31 (see FIGS. 1 and 4). The pin 61 is apertured at its outer end and carries a keeper 64, secured to the leg 55 by a chain 65, which can be inserted through the end of the locking pin on the opposite side of the tab 63 so as to lock the leg 55 in its lowered support position.

The lower end of the leg 55 carries a foot plate 70 which, when the leg 55 is in support position as shown in FIG. 1 and by dashed lines in FIG. 2, flatly abuts the ground and establishes a point of support that is positioned laterally of and is well spaced from the line of the plow disks 13. The stand 55 thus provides what is, in effect, the apex of a triangular base of support for the plow 10.

It will be understood, of course, that when the plow beam 12 is in its alternate operating position, that illustrated in FIG. 6, the point of support afforded by the stand 15 would be quite close to a line passing through the disks 13 so that the plow would be unstable if released from the tractor. As stated above, the latch 56 prevents the leg 55 from being swung down into support position when the plow beam is in its alternate FIG. 6 position and, hence, the possibility of inadvertently leaving the plow 10 parked unstably is avoided.

The latch 56 is defined by a key slot 71 formed in the foot plate 70 to slip over the elongated drag link 48. The angle of the plate 70 with respect to the leg 55 is such that the plate is disposed at substantially right angles to the drag link 48 when the leg 55 is swung to its solid line, transport position and the beam 12 is positioned in its support position, as illustrated in FIG. 2. The slot 71, with the parts so disposed, easily clears the link 48 so that the leg 55 can be freely moved on or off the link so as to release the latch 56 and permit the stand 15 to be moved from transport to support positions. It will be apparent that with the slot 71 hooked over the link 48, the leg 55 is firmly latched well clear of the ground so as not to interfere with transport or operation of the plow 10.

However, when the beam 12 is swung to its alternate operating position, the foot plate 70 becomes canted with respect to the drag link 48 so that a shoulder 72 of the key slot 71 blocks removal of the plate 70 from the link 48 (see particularly FIG. 8). Thus, the latch 56 defined by the interaction between the plate 70 and the link 48 becomes locked up when the plow beam 12 is swung to the left of the direction of plow movement, with the result that the user of the plow cannot then inadvertently drop the stand 15 into support position and unhitch the plow. The user of the plow 10 must first cause the beam 12 to be swung to the right of the direction of plow movement to the position shown in FIGS. 1 and 2, whereupon the latch 56 permits the stand 15 to be easily swung down and locked in support position. The plow can then be lowered onto the ground and released from the tractor where it will remain solidly supported.

It will be apparent that the parking stand 15 is quite simple in construction so as to be economical to manufacture and easy to use. The stand 15 provides a rigid point of support giving the plow a triangular parking base that is quite stable, and the stand latch 56 prevents an inadvertent attempt to park the plow in an unstable condition.

I claim as my invention:

1. A two-way plow comprising, in combination, a main frame adapted to be coupled to a tractor hitch, a plow beam pivoted about a vertical axis on said main frame, a plurality of plow elements mounted on said beam, means for shifting said beam about said axis so as to aline said elements off to one side or the other of said main frame, a stand leg pivotally secured to said main frame and having a support position providing a point of support well spaced from the line of plow elements when the latter are alined off to said one side, and latch means releasable only when said elements are alined to said one side for securing said leg in an elevated transport position.

2. A two-way plow comprising, in combination, a main frame adapted to be coupled to a tractor hitch, a plow beam pivoted about a vertical axis on said main frame, a plurality of plow elements mounted on said beam, means for shifting said beam about said axis so as to aline said elements off to one side or the other of said main frame, a stand leg pivotally secured to said main frame and having a support position providing a point of support well spaced from the line of plow elements when the latter are alined off to said one side, a releasable lock for securing said leg in said support position, and a latch for releasably securing said leg in an elevated transport position.

3. A two-way plow comprising, in combination, a main frame adapted to be coupled to a tractor hitch, a plurality of plow elements shiftably mounted on said main frame, means for shifting said elements to one angle or another with respect to said main frame, a stand leg pivotally secured to said main frame and having a support position providing a point of support well spaced from the line of plow elements when the latter are alined to one side angle, an elongated member secured to said elements so as to shift therewith, and a latch plate fixed to said leg and having a key slot therein, said plate slot being freely positionable over said member when said elements are alined at said one angle so as to releasably support said leg in an elevated transport position, said key slot defining plate becoming canted with respect to said member when said elements are alined to said other angle so as to prevent removal of the plates from the member.

4. A two-way plow comprising, in combination, a main frame adapted to be coupled to a tractor hitch, a plow beam pivoted about a vertical axis on said main frame, a plurality of plow elements mounted on said beam, means for shifting said beam about said axis so as to aline said elements off to one side or the other of said main frame, a stand leg pivotally secured to said main frame and having a support position providing a point of support well spaced from the line of plow elements when the latter are alined off to said one side, an elongated member secured to said beam so as to swing from side to side therewith, and a latch plate fixed to said leg and having a key slot therein, said plate slot being freely positionable over said member when said beam and said elements are alined to said one side so as to releasbly support said leg in an elevated transport position, said key slot defining plate becoming canted with respect to said member when said beam and said elements are alined to said other side so as to prevent removal of the plate from the member.

5. A two-way plow comprising, in combination, a main frame adapted to be coupled to a tractor hitch, a plow beam mounted about a vertical axis on said main frame, a plurality of plow elements mounted on said beam, means for shifting said beam about said axis so as to aline said elements off to one side or the other of said plow beam, a stand leg pivotally secured to said main frame and having a support position providing a point of support well spaced from the line of plow elements when the latter are alined off to said one side, an elongated member secured to said beam so as to swing from side to side therewith, and a foot plate fixed to the end of said leg so as to flatly abut the ground when the latter is in said support position, said foot plate having a key slot therein that is freely positionable over said member when said beam and said elements are alined to said one side so as to releasably support said leg in an elecated transport position, said foot plate becoming canted with respect to said member when said beam and said elements are alined to said other side so as to prevent removal of the plate from the member.

References Cited by the Examiner

UNITED STATES PATENTS

| | | | |
|---|---|---|---|
| 2,090,776 | 8/37 | Arndt | 37—164 |
| 2,092,608 | 9/37 | Lindgren | 172—274 |
| 2,834,274 | 5/58 | Barrett | 172—219 |
| 2,900,033 | 8/59 | Coviello | 172—212 |
| 2,949,161 | 8/60 | Campbell | 172—212 |
| 2,959,233 | 11/60 | Scarlett | 172—274 |

T. GRAHAM CRAVER, *Primary Examiner.*

ABRAHAM G. STONE, *Examiner.*